United States Patent [19]

Tran et al.

[11] Patent Number: 5,391,879
[45] Date of Patent: Feb. 21, 1995

[54] RADIATION DETECTOR

[75] Inventors: Nang T. Tran, Lake Elmo; Luciano W. Morrone, Birchwood Township, County Ramsey, both of Minn.

[73] Assignee: Minnesota Mining and Manufacturing Company, Saint Paul, Minn.

[21] Appl. No.: 154,962

[22] Filed: Nov. 19, 1993

[51] Int. Cl.6 .............. G01T 1/20; G01T 1/24
[52] U.S. Cl. .................. 250/367; 250/368; 250/370.09; 250/370.11
[58] Field of Search .......... 250/366, 367, 368, 370.09, 250/370.11

[56] References Cited

U.S. PATENT DOCUMENTS

| | | |
|---|---|---|
| 3,652,855 | 3/1972 | McIntyre et al. |
| 3,703,660 | 11/1972 | Fyler ................. 313/92 LF |
| 4,299,447 | 11/1981 | Soltan et al. |
| 4,593,400 | 6/1986 | Mouyen . |
| 4,613,210 | 9/1986 | Pollard . |
| 4,755,681 | 7/1988 | Oka et al. .......... 250/367 X |
| 4,874,227 | 10/1989 | Matsukawa et al. |
| 4,878,234 | 10/1989 | Pfeiffer et al. ........ 250/370.09 X |
| 4,910,405 | 3/1990 | Suzuki et al. ........ 250/368 |
| 5,008,547 | 4/1991 | Molteni et al. ....... 250/368 |
| 5,079,423 | 1/1992 | Hagiwara et al. ..... 250/368 |
| 5,129,028 | 7/1992 | Soltan ................ 385/120 |
| 5,144,141 | 9/1992 | Rougeot et al. ...... 250/369 |
| 5,150,394 | 9/1992 | Karellas ............. 250/370.09 X |
| 5,153,438 | 10/1992 | Kingsley ............ 250/370.09 |

FOREIGN PATENT DOCUMENTS

| | | | |
|---|---|---|---|
| 2167279 | 5/1986 | Germany ............ 250/370.09 |
| 55-89772 | 7/1980 | Japan ............... 250/367 |
| 58-21580 | 2/1983 | Japan ............... 250/368 |
| 61-68580 | 4/1986 | Japan ............... 250/366 |
| 61-226677 | 10/1986 | Japan ............... 250/370.11 |
| WO91/15786 | 10/1991 | WIPO . |

*Primary Examiner*—Constantine Hannaher
*Assistant Examiner*—Edward J. Glick
*Attorney, Agent, or Firm*—Gary L. Griswold; Walter N. Kirn; Gregory A. Evearitt

[57] ABSTRACT

A radiation detector containing: (a) a fiber optic network; (b) an array of pixelized phosphors on the X-ray incidence side of the fiber optic network; and (c) an array of pixelized sensors optically coupled to the other side of the fiber optic network, wherein: (i) the ratio of the surface area of a phosphor pixel to the surface area of a sensor pixel is in the range of about 1:1 to 1:64, and (ii) the ratio of the surface area of the core of each individual optical fiber of the fiber optic network to the surface area of a phosphor pixel is in the range of about 1:4 to 1:160.

13 Claims, 2 Drawing Sheets

RADIATION DETECTOR

FIELD OF THE INVENTION

This invention relates to radiation imaging and in particular, it relates to an apparatus used for radiation detection.

BACKGROUND OF THE ART

In the field of X-ray detection it is well-known to employ so-called intensifying screens to increase the radiation available for detection purposes. Such screens contain an X-ray luminescent material (e.g., phosphor) which is selected to emit a relatively large number of light photons for each X-ray photon striking the material. This effectively amplifies the X-rays to be detected since both the X-rays themselves and light emitted by X-ray-induced emission from the luminescent material are available for detection on film or other detection mediums or devices, such as arrays of light-sensitive electronic sensors (e.g., photodiodes, photoconductors, charge-coupled devices, etc.). The primary incentive to use such intensifying screens in medical applications is to reduce the amount of X-ray radiation which is required to produce a given exposure, thereby reducing the radiation risk to which a patient or operator is exposed.

Detector panels envisioned for digital radiography ideally employ pixelized phosphor screens which are aligned with the electronic elements used to detect the photons generated when an X-ray interacts with the phosphor. In the use of digital radiographic screens for a majority of diagnostic X-rays, the pixel size that is required in order to obtain the necessary resolution is on the order of 85 microns. In the case of digital radiography for mammography, this pixel dimension decreases to the order of 40 microns. In any digital radiographic scheme which utilizes a pixelized phosphor to improve the resolution and isolation of adjacent pixels, the relative alignment of the two elements, the phosphor pixel and the detector pixel, becomes critical. Several schemes to eliminate this precise alignment of two components have centered around the direct formation of the phosphor pixels on the sensor pixels by the growth of a columnar phosphor over specific regions, or the cutting or ablating of phosphors deposited on sensing elements, into pixels.

An alternative approach to pixelizing directly on the sensor device is to separately pixelize both a phosphor sheet and a sensor array. The two pixelized arrays are then joined together while insuring that the pixels are precisely aligned for the two layers. For example, the method used in U.S. Pat. No. 5,153,438 utilizes a pixelized phosphor screen which is bonded to an array of detector elements. In this patent, the pixels of the phosphor are generated to be the same size and shape as the active area of the detector array, formed on a silicon wafer. A series of alignment marks are included in both the phosphor substrate and the detector array substrate to facilitate the precise alignment of the individual pixels of the phosphor with the pixels of the detectors that is required.

The need for precise alignment of the various elements of the radiographic panel is exemplified by the need for a radiologist interpreting the X-ray image to discern radiographic features on the image from the artifacts of the imaging process. It becomes especially critical when the image under examination is a standard full size 14 by 17 inch radiographic image. Current approaches to the construction of such panels require the arrangement of individual sensor arrays into a large scale panel. The sensing elements are composed of individual detector elements (e.g., photodiodes) arranged in arrays formed on single crystal silicon wafers. A typical dimension for these wafers is four inches in diameter. A regular square array is built on the wafer, and the edges are trimmed to permit the alignment of adjacent wafers edge-to-edge to form the ultimate full-size panel. Unless sufficient care is exercised, an inactive area exists at the line of juncture of two adjacent wafers, thereby resulting in a line image on the output. During the interpretation of the radiographic image any feature occurring along this line image is lost.

X-ray image sensors utilizing fiber optic faceplates are known in the art. See, for example, U.S. Pat. Nos. 4,910,405 and 5,079,423. In such apparatus, a solid-state image-sensing device is connected to the phosphor screen through the fiber optic faceplate. The phosphor screen converts X-rays into light and then the fiber optic faceplate transmits an optical image onto the input side of the solid-state image-sensing device which transduces the optical image into an electric signal. In such conventional X-ray image sensors, the fiber optic faceplate is used to prevent X-ray radiation damage to the solid-stage image-sensing device. As the foregoing patents indicate, the core glass of the optical fibers sometimes contains cerium oxide, lanthanum oxide, barium oxide, lead oxide, etc. Such materials help to increase the ability of the fiber optic faceplate to absorb incident X-rays, thereby further deceasing the damage to the solid-state image-sensing device.

U.S. Pat. No. 4,593,400 discloses a tapered fiber optic faceplate used in conjunction with a scintillator and a detector for X-rays in dental applications. The objective in this patent in using the tapered optical fibers is to decrease the size of an optical image projected onto a particular photodetector or sensor. PCT Publn. No. WO 91/15786 discloses a fiber optic beam-imaging apparatus with tapered plastic fibers. As with U.S. Pat. No. 4,593,400, the tapered optical fibers are used to produce a reduced-scale optical image.

U.S. Pat. No. 5,008,547 discloses a fiber optics device containing an obliquely cut end surface which transmits an optical image projected onto that surface to a second end face of the fiber optics device, thereby forming an image with a reduced surface area on the second end face.

U.S. Pat. No. 5,129,028 discloses an improved grid-free modular, large screen display. The improvement resides in the use of light-guides to eliminate apparent spacings between abutted display modules.

U.S. Pat. No. 5,144,141 discloses a radiation imaging device having a plurality of scintillator elements that are each optically coupled to a plurality of internal gain photoconductors. Each photodetector is electrically coupled to a respective detect-and-hold circuit which amplifies and stores the pulse generator by the photodetector. The stored pulses are sampled via a multiplexed switching arrangement to allow the stored signal from each detect-and-hold circuit to be processed to produce a digitized image signal which corresponds to the energy level of and location on the array of the detected incident radiation. The digitized imaging signal is then supplied to display memory and analysis equipment for the device.

Although the foregoing radiation detectors or imaging devices have been satisfactory for their intended use, improvements in the design and fabrication of radiation detectors are constantly sought and needed in the industry. For example, it would be desirable to have a radiation detector where individual pixel elements of the phosphor are aligned with individual pixel elements of the sensor without having to precisely position inactive areas of the phosphor with inactive areas of the detector, particularly when the size of the pixels becomes less than 85 microns. It would also be desirable to have a radiation detector with individual detector arrays (tiles or sub-modules) laid together into a large size radiographic panel without having inactive areas between adjacent tiles which would serve to limit the information accessible during the reading of an image from a radiographic panel.

SUMMARY OF THE INVENTION

In accordance with the present invention, it has now been discovered that an improved radiation detector results from the use of a fiber optic network comprised of sufficiently small optical fibers in conjunction with a structured phosphor screen in which the pixelized phosphors of the phosphor screen are smaller than the associated pixels on a sensor surface.

Thus, the present invention provides a radiation detector comprising: (a) a fiber optic network; (b) an array of pixelized phosphors on the X-ray incidence side of the fiber optic network; and (c) an array of pixelized sensors optically coupled to the other side of the fiber optic network, wherein: (i) the ratio of the surface area of a phosphor pixel to the surface area of a sensor pixel is in the range of about 1:1 to 1:64, and (ii) the ratio of the surface area of the core of the individual optical fibers of the fiber optic network to the surface area of a phosphor pixel is in the range of about 1:4 to 1:160.

In one preferred embodiment, the ratio in (i) above is in the range of about 1:1 to 1:16 and more preferably, about 1:2 to 1:4. Additionally, the ratio in (ii) above is preferably in the range of about 1:4 to 1:64 and more preferably, about 1:16 to 1:30.

In a second preferred embodiment, the fiber optic network comprises a fiber optic faceplate which is inclined to the array of pixelized phosphors.

In a third preferred embodiment, the array of pixelized sensors is based on single crystal silicon.

In a fourth preferred embodiment, the array of pixelized phosphors are formed on back-illuminated, thinned-out single crystal silicon.

In a fifth preferred embodiment, the optical fibers of the fiber optical network are tapered, with a reduction in the cross-sectional area from the phosphor contacting surface to the sensor contacting surface.

The inventive radiation detector offers a number of advantages. To begin with, the fiber optic network serves to reduce the amount of radiation impinging upon the sensor. Additionally, by carefully controlling the sizes of the phosphor pixels, the sensor pixels, and diameter of the core of the optical fibers to within the foregoing disclosed range of ratios, alignment problems of the pixelized phosphor and the pixelized sensor encountered in conventional devices are greatly reduced or eliminated. Also, the fiber optic network serves as a mechanical support for the fabrication of the thinned-out silicon sensor tiles since the sensor tiles are generally too thin to be handled by themselves. Finally, when tapered optical fibers are utilized, the use of a multiplicity of sensor tiles abutted closely together with minimal "dead space" between the sensor tiles is facilitated.

In this application:

"pixelized phosphor" or "phosphor pixel" means a phosphor element that is optically isolated from adjoining phosphor elements;

"slot" means an empty space or gap which separates one phosphor element from another;

"array" means a collection of elements arranged in a predetermined order;

"sensor" means an electronic device for convening electromagnetic radiation into a corresponding electrical signal (e.g., a photodiode, photoconductor, or charge-coupled device);

"pixelized sensor" or "sensor pixel" means a sensor which is optically and electronically isolated from adjoining sensor elements;

"mesa" means a raised structure on the surface of a substrate consisting of a surface essentially parallel to the surface of the substrate and sloped surfaces connecting the top of the structure to the essentially horizontal surface of the substrate, the cross-section of a mesa usually resembling a truncated pyramid with the smaller parallel surface furthest from the substrate;

"multiplicity of discontinuous steps" means several pairs of connected small surfaces, both parallel to and inclined to a major surface of a substrate, joined together such that these multiple pairs of steps approximate the sloped surfaces of a mesa; and "ridge" means a raised or elevated structure or a recessed structure relative to the surface of a substrate and having an angular inclined slope and an angular declined slope which connect or are coincident at one common region or point, the cross section of a ridge usually resembling a triangle.

Other aspects, advantages, and benefits of the present invention are apparent from the detailed description, the examples, and claims.

DETAILED DESCRIPTION OF THE INVENTION

Figure 1:
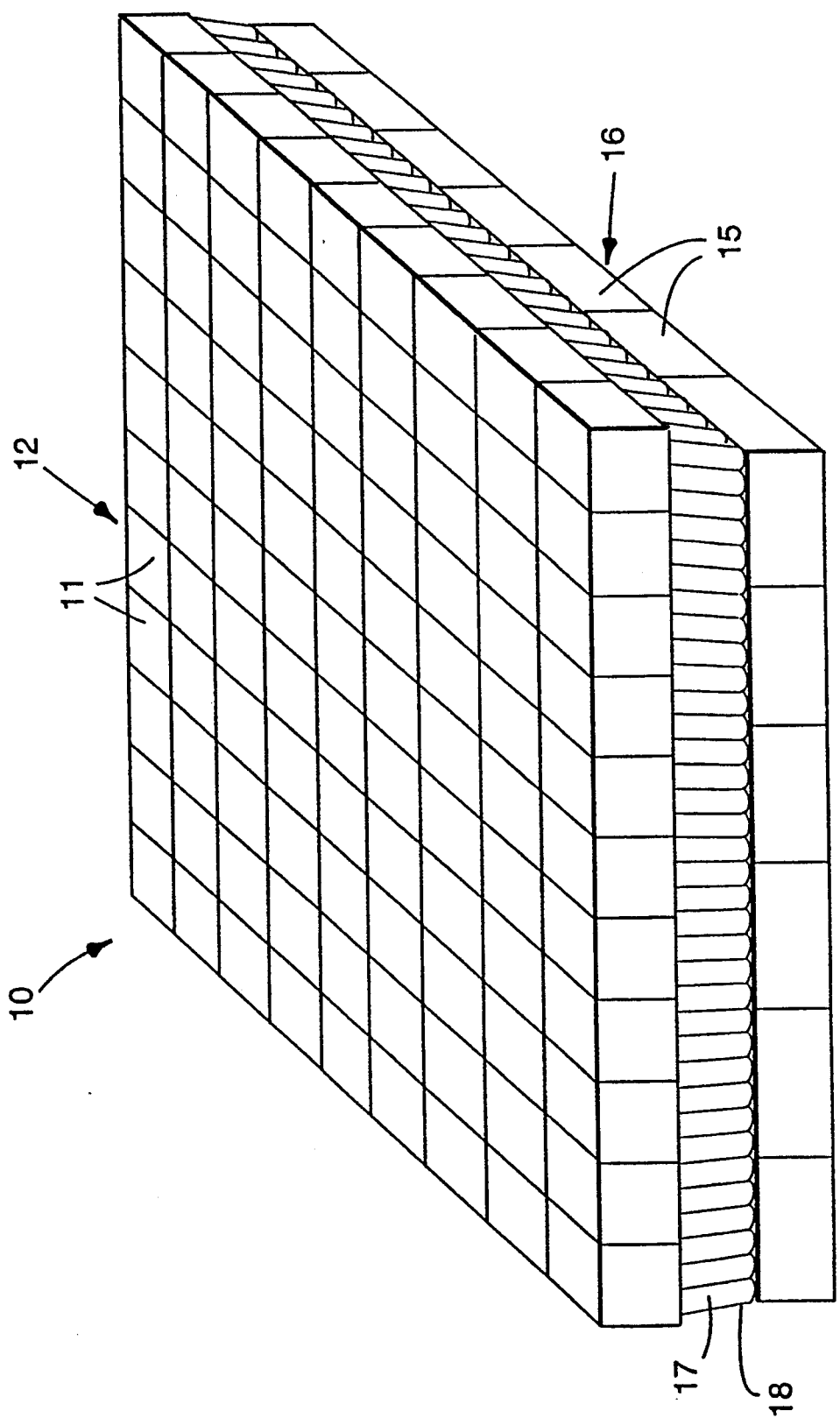
FIG. 1 is a perspective view of the details of a radiation detector of the present invention.

Any conventional phosphor may be utilized in the present invention. Nonlimiting examples of such phosphors include:

phosphors represented by $BaSO_4:A_x$ (where A is at least one element selected from Dy, Tb, and Tm, and x satisfies $0.001 \leq x \leq 1$ mol %) as disclosed in Japanese Patent Publication No. 80487/1973;

phosphors represented by $MgSO_4:A_x$ (where A is either Ho or Dy, and x satisfies $0.001 \leq x \leq 1$ mol %) as disclosed in Japanese Patent Publication No. 80488/1973;

phosphors represented by $SrSO_4:A_x$ (where A is at least one element selected from Dy, Tb and Tin, and x satisfies $0.001 \leq x \leq 1$ mol %); as disclosed in Japanese Patent Publication No. 80489/1973;

phosphors composed of $Na_2SO_4$, $CaSO_4$ or $BaSO_4$ containing at least one element selected from Mn, Dy and Tb as disclosed in Japanese Patent Publication No. 29889/1976;

phosphors composed of BeO, LiF, MgSO$_4$ or CaF$_2$ as disclosed in Japanese Patent Publication No. 30487/1977;

phosphors composed of Li$_2$B$_4$O$_7$:Cu or Ag as disclosed in Japanese Patent Application No. 39277/1978;

phosphors represented by either Li$_2$O.(B$_2$O$_2$)$_x$:Cu (where x satisfies $2<x \leqq 3$), or Li$_2$O.(B$_2$O$_2$)$_x$:Cu, Ag (where x satisfies $2<x \leqq 3$), disclosed in Japanese Patent Publication No. 47883/1979;

phosphors represented by SrS:Ce, Sm; SrS:Eu, Sin; La$_2$O$_2$S:Eu, Sm; and (Zn,Cd)S:Mn, X (where X is halogen) as disclosed in U.S. Pat. No. 3,859,527;

phosphors represented by ZnS:Cu or Pb; barium aluminate phosphors represented by BaO.(Al$_2$O$_3$)$_x$:Eu (where x satisfies $0.8 \leqq x \leqq 10$) and alkali earth metal-losilicate phosphors represented by M$^{II}$nO$_x$SiO$_2$:A (where M$^n$ is Mg, Ca, Sr, Zn, Cd or Ba; A is at least one element selected from Ce, Tb, Eu, Tm, Pb, Tl, Bi and Mn; and x satisfies $0.5 \leqq x \leqq 2.5$) as disclosed in Japanese Patent Publication No. 12142/1980;

alkali earth fluorohalide phosphors represented by (Ba$_{1-x-y}$Mg$_x$Ca$_y$)FX:eEu$^{2+}$ (where X is at least one of Br and Cl; and x, y and e satisfy $0<x+y \leqq 0.6$, $xy \neq 0$, and $10^{-6} \leqq e \leqq 5 \times 10^{-2}$, respectively);

phosphors represented by LnOX:xA (where Ln is at least one element selected from La, Y, Gd, and Lu; X is Cl and/or Br; A is Ce and/or Tb; and x satisfies $0<x<0.1$) as disclosed in Japanese Patent Publication No. 12144/1980;

phosphors represented by (Ba$_{1-x}$M$^{II}_x$)FX:yA (where M$^{II}$ is at least one element selected from Mg, Ca, Sr, Zn, and Cd; X is at least one element selected from Cl, Br and I; A is at least one element from Eu, Tb, Ce, Tm, Dy, Pr, Ho, Nd, Yb, and Er; x and y satisfy $0 \leqq x \leqq 0.6$ and $0 \leqq y \leqq 0.2$, respectively) as disclosed in Japanese Patent Publication No. 12145/1980;

phosphors represented by BFX:xCe, yA (where X is at least one element selected from Cl, Br, and I; A is at least one element selected from In, Tl, Gd, Sm, and Zr; and x and y satisfy $0<x \leqq 2 \times 10^{-1}$ and $0<y \leqq 5 \times 10^{-2}$, respectively) as disclosed in Japanese Patent Publication No. 84389/1980; rare-earth element-activated divalent metal fluorohalide phosphors represented by M$^{II}$FX.xA:yLn (where M$^{II}$ is at least one element selected from Mg, Ca, Ba, Sr, Zn, and Cd; A is at least one oxide selected from BeO, MgO, CaO, SrO, BaO, Zno, Al$_2$O$_3$, Y$_2$O$_3$, La$_2$O$_3$, In$_2$O$_3$, SiO$_2$, TiO$_2$, ZrO$_2$, GeO$_2$, SnO$_2$, Nb$_2$O$_5$, Ta$_2$O$_5$, and ThO$_2$; Ln is at least one element selected from Eu, Tb, Ce, Tm, Dy, Pr, Ho, Nd, Yb, Ev, Sm, and Gd; X is at least one element selected from Cl, Br and I; and x and y satisfy $5 \times 10^{-5} \leqq x$ 0.5 and $0<y \leqq 0.2$, respectively) as disclosed in Japanese Patent Publication No. 160078/1980;

phosphors represented by either xM$_3$(PO$_4$)$_2$.NX$_2$:yA or M$_3$(PO$_4$)$_2$:yA (where each of M and N is at least one element selected from Mg, Ca, Sr, Ba, Zn, and Cd; X is at least one element selected from F, Cl, Br, and I; A is at least one element selected from Eu, Tb, Ce, Tin, Dy, Pt, Ho, Nd, Yb, Er, Sb, Tl, Mn, and Sn; and x and y satisfy $0<x \leqq 6$ and $0 \leqq y \leqq 1$, respectively); phosphors represented by either nRX$_3$.mAX'$_2$:xEu or nReX$_3$.mAX'$_2$:xEu, ySm (where R is at least one element selected from La, Gd, Y, and Lu; A is at least one element selected from Ba, Sr, and Ca; each of X and X' is at least one element selected from F, Cl, and Br; x and y satisfy $1 \times 10^{-4} < x < 3 \times 10^{-1}$ and $1 \times 10^{-4} < y < 1 \times 10^{-1}$, respectively; and n/m satisfies $1 \times 10^{-3} < n/m < 7 \times 10^{-1}$); alkaline halide phosphors represented by M$^I$X.aM$^{II}$X'$_2$.bM$^{III}$X''$_3$:cA (where M$^I$ is at least one alkali metal selected from Li, Na, K, Rb, and Cs; M$^{II}$ is at least one divalent metal selected from Be, Mg, Ca, Sr, Ba, Zn, Cd, Cu, and Ni; M$^{III}$ is at least one trivalent metal selected from Sc, Y, La, Ce, Pr, Nd, Pm, Sm, Eu, Gd, Tb, Dy, Ho, Er, Tm, Yb, Lu, Al, Ga, and In; each of X, X' and X" is at least one halogen selected from F, Cl, Br, and I; A is at least one element selected from Eu, Tb, Ce, Tin, Dy, Pr, Ho, Nd, Yb, Er, Gd, Lu, Sin, Y, Tl, Na, Ag, Cu, and Mg; and the values a, b and c satisfy $0 \leqq a < 0.5$, $0 \leqq b < 0.5$ and $0 < c \leqq 0.2$ respectively) as disclosed in Japanese Patent Publication No. 148285/1982;

phosphors represented by cerium-doped lutetium oxyorthosilicate Lu$_{2(1-x)}$Ce$_{2x}$(SiO$_4$)O as mentioned in the *IEEE Transactions of Nuclear Science*, vol. 34, no. 4, 1992, pp. 502–505;

phosphors represented by neodymium doped in yttrium orthosilicate (Nd$^{3+}$:Y$_2$SiO$_5$) as mentioned in *IEEE Journal of Quorum Electronics*, vol. 26, no. 8, August 1990, pp. 1405-1411 and in European Patent Application No. 0,253,589;

phosphors represented by Gd$_2$O$_2$S:R where R is at least one element selected from Tb, Eu, Pr, and Tin; and phosphors represented by thermoluminescent materials such as CsI:Na, LiF, and the like.

The presently preferred phosphors are ones composed of alkali halides.

The phosphor can be deposited on a support by any suitable method. Nonlimiting examples of such methods include:

The first method is vacuum evaporation. In this process, a vacuum evaporating apparatus into which a support has been placed is evacuated to a level of $10^{-6}$ Torr or so. Then, at least one aforementioned phosphor is vaporized by resistive heating, electron beam heating, or the like to produce a layer of the phosphor with a desired thickness formed on the surface of the support. The layer containing a phosphor can also be formed by repeating the vaporizing procedures a number of times. In addition, a covacuum evaporation can be conducted using a plurality of resistive heaters or electron beams. It is also possible to heat or cool the deposited layer during vaporization, if necessary, or to heat-treat the deposited layer after vaporizing.

After the vacuum evaporating operation, the phosphor-containing layer is optionally provided with a protective layer on its side opposite to the support. Alternatively, it is possible to have the phosphor layer formed on a protective layer first, and then to provide it with a support.

The second method is a sputtering technique. In this process, a sputtering apparatus in which a support has been placed is evacuated to about $10^{-6}$ Torr. Then, an inert gas such as Ar or Ne is introduced into the apparatus to raise the inner pressure up to a level of about $10^{-3}$ Torr. Afterwards, at least one aforementioned phosphor is sputtered to have a layer of the phosphor with a desired thickness deposited on the surface of the support. The phosphor layer can also be formed by repeating a plurality of sputtering procedures.

After the sputtering operation, the phosphor layer is provided with a protective layer on its side opposite to the support if necessary. Alternatively, it is allowed to have the phosphor layer formed on a protective layer first, and then provide it with a support.

The third method is chemical vapor deposition (CVD). In this method, the phosphor layer is obtained on the support by decomposing the intended phosphor or organometallic compound containing the raw material of the phosphor using thermal energy, high-frequency power, and the like.

The fourth method is a spraying technique. In this method, the phosphor layer is obtained by spraying phosphor powder onto a tacky layer of the support.

The fifth method is a baking method. In this method, an organic binder-containing phosphor powder dispersed therein is coated on a support which is then baked and thus, the organic binder is volatilized, and a phosphor layer without binder is obtained.

The sixth method is a curing method. In this method, an organic polymerizable binder containing phosphor powder dispersed therein is coated on a support which is then subjected to conditions which initiate and complete polymerization of the binder, thereby forming a solid composite mass of polymerized binder and phosphor.

The seventh method is a spray pyrolysis method. In this method, the phosphor is formed by spraying a solution of base elements suspended in a suitable volatilizable carrier onto a heated support which causes the vaporization of the carrier during deposition of the phosphor.

The thickness of the phosphor layer is varied according to the radiosensitivity of the intended radiographic image panel, and the type of the phosphor, but is preferably selected from a range from 30 $\mu$m to 1000 $\mu$m, especially from 50 $\mu$m to 800 $\mu$m.

When the thickness of the phosphor layer is less than 30 $\mu$m, the radiation absorptance thereof deteriorates rapidly, thereby lowering the radiation sensitivity. The graininess of an image obtained therefrom is increased causing a deteriorated image. In addition to the foregoing, the phosphor layer becomes transparent and thus, the two dimensional spreading of excitation rays in the phosphor layer is greatly increased, which results in the tendency wherein image sharpness is deteriorated.

The support for the phosphor can be various polymeric materials, glass, tempered glass, quartz, metals, a fiber optic faceplate, and the like. Among them, flexible or easily roll-processable sheet materials are especially suitable in view of the handling of information recording material. From this point of view, the especially preferable material of is, for example, plastic film as cellulose acetate, polyester, polyethylene terephthalate, polyamide, polyimide, cellulose triacetate or polycarbonate film, or metallic sheets such as aluminum, steel, or copper.

In one preferred embodiment, the deposited phosphor is then pixelized or cellularized by exposing the phosphor material to electromagnetic radiation, using suitable masking techniques, thereby ablating the phosphor segmentally to produce a series of structures in both the X and Y directions to produce an array separated by slots. The resulting slots between the pixelized phosphors are filled with phosphor material of the same or different composition as utilized originally such that each of the pixelized phosphors on the support are separated by a width of from 0.5 to 25 microns and more preferably by about 0.5 microns. Using a phosphor material of a different composition than that used originally in the ablation process may enhance the containment of light within a single pixel since the differences in the index of refraction will cause light traversing within a pixel to be reflected back into the pixel when the index of refraction within the pixel is greater than that exterior to the pixel.

Any suitable source may be used to generate the electromagnetic radiation such as an excimer laser, $CO_2$ laser, or YAG:Nd laser. The power density required to ablate the phosphor will vary depending on the composition of the phosphor; the beam size; and the type of substrate used and will be readily apparent to those of ordinary skill in the art. The upper limit of the power density required is restricted to prevent destruction of the substrate material. For example, in the case of an excimer laser with a 20 nanosecond pulse width, the amount of power density will preferably be in the range of from about 30–700 $J/cm^2$, more preferably from about 60–240 $J/cm^2$.

Excimer lasers are presently preferred. An excimer laser is an excited dimer laser where two normally non-reactive gases (for example Krypton, Kr, and Fluorine, $F_2$) are exposed to an electrical discharge. One of the gases (Kr) is energized into an excited state (Kr*) in which it can combine with the other gas ($F_2$) to form an excited compound (KrF*). This compound gives off a photon and drops to an unexcited state which, being unstable, immediately disassociates to the original gases (Kr and $F_2$) and the process is repeated. The released photon is the laser output. The uniqueness of the excimer laser is its high efficiency in producing short wavelength (UV) light and its short pulse widths. These attributes make the excimer laser useful for industrial applications.

Suitable masking techniques are well known and include shadow masking wherein the mask is in intimate contact with the layer to be ablated and projection masks which require an optical system to either enlarge or shrink the masking pattern projected onto the layer to be ablated.

Optionally, a thin layer (e.g., 5000 Angstroms) of a suitable highly light-reflecting material, such as gold or silver, can be formed on the walls of the slots formed from the ablation step. A sputtering, evaporation, electroless plating, plating, or other thin film deposition techniques can be utilized. Also, optionally, a black or light-absorbing material can be deposited to minimize light scattering. This manner of coating will confine the light within a pixel boundary; however, the total light output from the pixel may be decreased due to the absorbing of light by the deposited material.

The resulting phosphors and thin metal films, if utilized, can then be planarized by any suitable method such as mechanical abrasion, ion milling, chemical etching, and mechano-chemical lapping.

Another possible process for making a pixelized phosphor is as follows:
 (a) providing a substrate for deposition and growth of an alkali halide phosphor;
 (b) forming a patterned surface on the substrate comprising a plurality of mesas, each mesa having an angular inclined slope, an angular declined slope, and a horizontal surface, and each mesa being separated from one another by horizontal segments of the substrate and wherein:
  (i) the ratio of the height of each mesa to the width of each horizontal segment of the substrate separating the mesas is in the range of about 1:20 to 1:4; preferably, about 1:15 to 1:4; and more preferably, about 1:10 to 1:5;
  (ii) the ratio of the width of each mesa to the width of each horizontal segment of the substrate separating the mesas is in the range of about 1:30 to 1:4; preferably, about 1:20 to 1:8; and more preferably, about 1:15 to 1:10; and (iii) the angles of incline and decline of each mesa are between about 5° and 85° C.; preferably, between about 20° to 45° C.; and more preferably, between about 30° to 40° C.; and (c) depositing an alkali halide phosphor on the patterned surface of the substrate of step (b), thereby forming cracks, in the deposited phosphor, which originate or emanate from the angular inclined and/or declined slopes of each mesa.

Optionally, the cracked phosphor structure resulting from step (c) is annealed in an inert atmosphere at a temperature of from about 150° to 300° C. for about 1 to 3 hours.

Preferably, the sloped sides of the mesas are made from a multiplicity of discontinuous smaller sloped segments, forming a series of angled steps which when viewed relative to the dimensions of the mesas appear to be a continuous incline or decline. Each segment of the incline or decline, however, is made from a sloped surface and a surface essentially parallel to the top of the mesa.

Another possible process for forming a pixelized phosphor comprising the steps of:

(a) providing a substrate for deposition and growth of an alkali halide phosphor, (b) forming a patterned surface on said substrate comprising a plurality of ridges, each of the ridges having an angular inclined slope, an angular declined slope, the inclined and declined slopes meeting at one common point, to form a structure having a triangular cross-sectional shape, each ridge being separated from one another by horizontal segments of said substrate and wherein:

(i) the ratio of the height of each ridge to the width of each horizontal segment of said substrate separating the ridges is in the range of about 1:100 to 1:5; preferably, about 1:30 to 1:10; and more preferably, about 1:20 to 1:15; and (ii) the ratio of the width of each ridge to the width of each horizontal segment of mid substrate separating the ridges is in the range of about 1:50 to 1:5; preferably, 1:25 to 1:10; and more preferably, about 1:20 to 1:15; and (c) depositing an alkali halide phosphor on the patterned surface of the substrate of step (b), thereby forming cracks, in the deposited phosphor, which originate or emanate from the angular inclined and/or declined slopes of each ridge.

Optionally, the cracked phosphor structure resulting from step (c) is annealed in an inert atmosphere at a temperature of from about 150° to 300° C. for about 1–3 hours.

The predetermined pattern of mesas or ridges can be made by any conventional process known to those skilled in the art. Microlithography techniques are typically used, with subsequent chemical itching or physical-chemical etching, or other techniques known to one skilled in the art such as an embossing technique, laser ablation technique, and others. The specific etching method will depend on the type of substrate and the geometry of the pattern desired. The desired patterns can also be obtained, for example, by exposing a glass under ultraviolet radiation with a mask, after which the exposed portion becomes crystallized and will be etched away. One of the representative example materials for this use is Fotoglass TM, available from Corning Glass of Corning, N.Y.

The phosphor pixel can be of any suitable shape such as, for example, circular, octagonal, pentagonal, hexagonal, square, or rectangular. A square shape is presently preferred.

Any conventional optical fiber can be used in the present invention. For example, the optical fibers may contain flint glass or rare earth oxide glass (e.g., terbium oxide or cerium oxide glass). The optical fibers may also contain $Gd_2S_2O$, $Na_2O_2$, $Al_2O_3$, CaO, MgO, $SiO_2$, and PbO. The optical fibers may be of any suitable shape such as, for example, circular, square, hexagonal, octagonal, pentagonal, or rectangular. A hexagonal shape is presently preferred. The diameter of the core of an optical fiber is generally about 4 to 25 and preferably, 6 to 16 microns. Any fiber whose dimensions give rise to a suitable ratio of cladding material to core material can be used. For best results, the cross-sectional area of the fiber should be at least four times the cross-sectional area of the cladding. The minimum effective width of the cladding is 1.5 microns.

In a preferred embodiment, the fiber optic network comprises a fiber optic faceplate. Optionally, at least a portion of the optical axis of the fiber optic faceplate is inclined from the normal axis of the array of pixelized phosphors.

In another preferred embodiment, the optical fibers of the fiber optic faceplate are tapered or attenuated. Fiber optic faceplate tapering results in a size difference between the lateral dimension top and the bottom of the faceplate of from about 1 to 10 mm and preferably, from about 2 to 4 mm. This reduction in size due to tapering provides the advantage of tiling the sensor sub-modules together without concern about the gap created between adjacent sensor sub-modules since the top surfaces of the fiber optic faceplates attached to each of the sub-modules will be a continuous surface while the sub-modules will be discontinuously adjacent to each other.

The pixelized phosphor can be attached to the fiber optic faceplate using an epoxy such as ES# B36428, or ES# B36427 available from Norland (New Brunswick, N.J.). The epoxy should have an index of refraction matching the index of refraction of both the phosphor and the sensor material (usually silicon).

The optical fibers are optically bonded to a substrate consisting of a sensor array or on a multitude of sensor arrays which can be described as being a "sub-module". A collection of sub-modules can be assembled by butting them together in an "edge-to-edge" manner to form a complete, large-size radiographic imaging panel. The process of forming the phosphor can also be made on the preassembled large-size radiographic imaging panel.

The sensor array can be made of amorphous silicon, single crystal silicon, cadmium telluride, copper indium diselenide, and other sensor materials known to one skilled in the art. The pixelized sensors may be of any suitable shape such as, for example, circular, square, rectangular, pentagonal, octagonal, or hexagonal. Preferably, the pixelized sensors will have the same shape as the pixelized phosphors. Squares are presently preferred. In the case of single crystal silicon, the sensor array can be a conventional sensor array on a silicon wafer from about 300 to about 700 microns in thickness. Additionally, the sensor array can be on a thinned silicon wafer, preferably from about 10–50 microns in thickness and more preferably, from about 10–20 microns in thickness. A sensor array on a sufficiently thinned silicon wafer has the advantage of being transparent to light so that the phosphor can illuminate the sensor array through the silicon, from the side opposite to the light-detecting sensor. The use of thinned out wafers, butted edge-to-edge, accomplishes a high fill factor to effectively collect the light from the phosphor. This manner of illumination is termed "back-illumination".

In a preferred embodiment, a microlens array is positioned between the fiber optic network and the sensor array. The microlens is typically composed of an acrylic-based resin (e.g., amorphous polyolefin) and serves to optimize the amount of light detected by the sensor array as the optical image emanates from the end of the optical fibers distal to the phosphor.

When an array of thinned-out single crystal silicon-based sensors are used in the present invention, the network of optical fibers is particularly advantageous because of the mechanical support it provides to the fragile thinned-out silicon sensors. Once the phosphor is coated on the fiber optic face plate, the phosphor can be pixelized according to any suitable technique as disclosed herein earlier. The resulting structure can then be laminated (optically bonded) to the sensor array tile composed of thinned-out silicon wafers. The edge portions of the thinned-out silicon can then be cut, lapped, planarized, and polished, thereby forming a radiation detector submodule. The edges of these submodules are sufficiently finished to permit adjacent submodules to be aligned to within 20 $\mu$m of each other.

The following non-limiting examples further illustrate the present invention.

EXAMPLE 1

Cesium iodide doped with 25 ppm of sodium (Phosphor Technology, Essex, England) was used as a source of phosphor. The CsI:Na was loaded into an SO-10 evaporation boat (R. D. Mathis, Long Beach, Calif.). The in-house built evaporator was evacuated down to $5 \times 10^{-6}$ Torr, and the 2" square quartz substrate was heated to 120° C. The deposition time was 30 minutes to yield a thickness of 70 microns of deposited phosphor. The deposited phosphor was ablated to form square holes 53 microns on an edge with a 106 micron center-to-center separation using an excimer laser operating at 63 W, 220 mJ, 225 Hz. The laser-ablated phosphor was then coated with a second deposition of the same phosphor under the same conditions, again to a thickness of 70 microns. The resulting pixelized phosphor with a total thickness of 140 microns was then stacked upon a 2" square fiber optic faceplate with a thickness of 1 mm and a fiber size of 6 microns in diameter (Schott Fiber Optics, Southbridge, Mass.). The pixelized phosphor/fiber optic faceplate combination was exposed under X-rays from the phosphor side to expose a film in intimate contact with the other side of the fiber optic plate, at both 40 kVp and 80 kVp at a distance of 40". A clear pattern of 10 lp/mm was observed at 40 kVp (20 mAs) and 8 lp/mm at 80 kVp (1 mAs).

EXAMPLE 2

For comparison with Example 1, a tandem sample was processed under the same conditions while omitting the laser ablation/pixelizing step. The resulting 140 micron thick phosphor was again stacked onto the fiber optic faceplate and exposed to X-rays as in Example 1. A pattern of 8 lp/mm was observed at 40 kVp (15 mAs) and 51 p/ram at 80 kVp (0.75 mAs).

With reference to the drawings, FIG. 1 depicts radiation detector (10) having an array (12) of individual phosphor pixels (11). The array of phosphor pixels (12) is optically coupled to a tapered fiber optic faceplate (18) containing individual tapered optical fibers (17). Coupled to the other side of the fiber optic faceplate is an array (16) of individual sensor elements (15).

Figure 2:
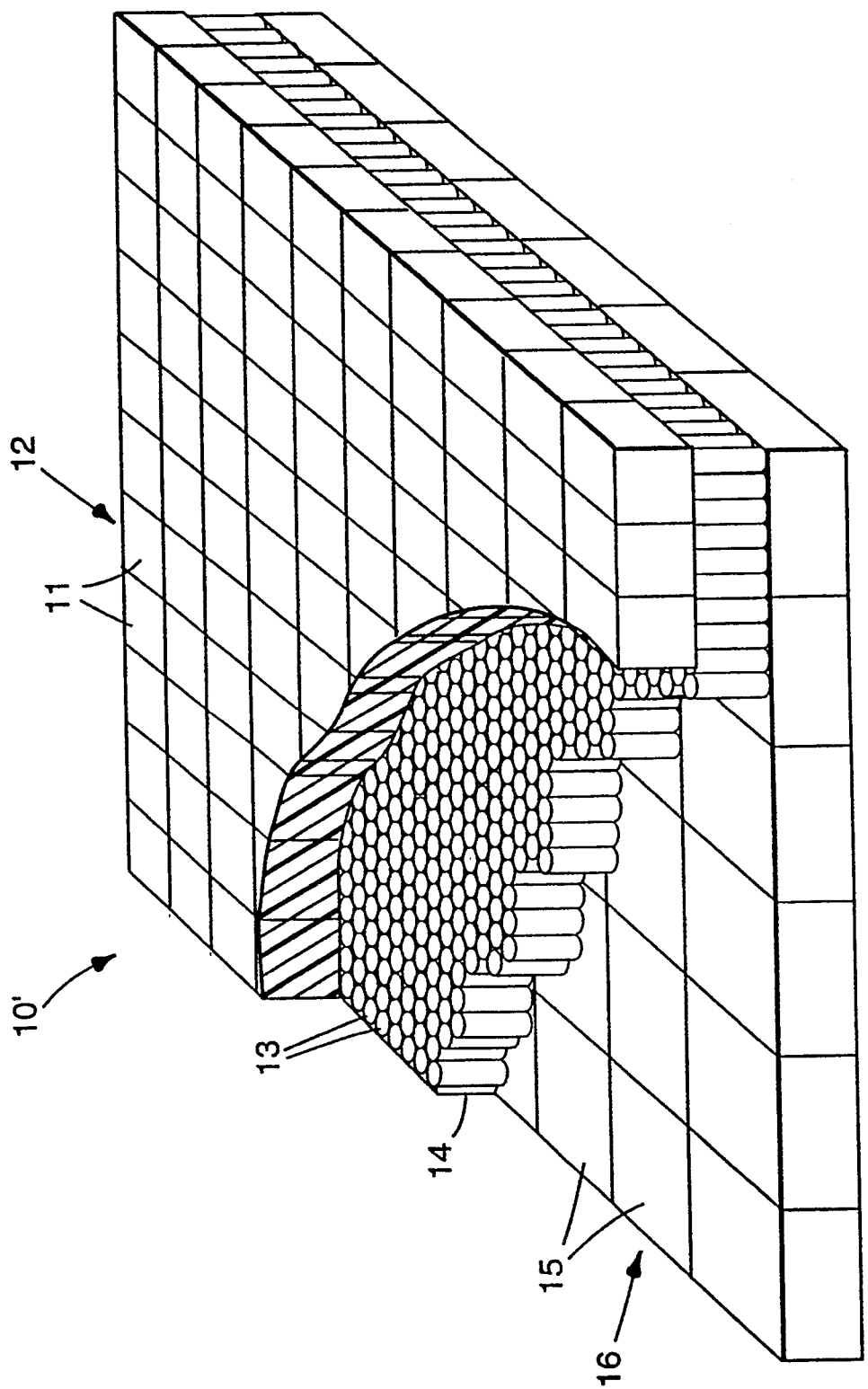
FIG. 2 is a broken away perspective view of the details of a radiation detector of the present invention.

FIG. 2 depicts a radiation detector (10) having an array (12) of individual phosphor pixels (11). The array of phosphor pixels is optically coupled to a fiber optic faceplate (14) containing individual optical fibers (13). Coupled to the other side of the fiber optic faceplate (14) is an array (16) of individual sensor elements (15).

Reasonable modifications and variations are possible from the foregoing disclosure without departing from either the spirit or scope of the present invention as defined in the claims.

What is claimed is:

1. An X-ray radiation detector comprising:
   (a) a fiber optic network having an X-ray incident side and an other side;
   (b) an array of pixelized phosphors on the X-ray incidence side of said fiber optic network; and
   (c) an array of pixelized sensors optically coupled to the other side of said fiber optic network, wherein:
   (i) the ratio of the surface area of a phosphor pixel to the surface area of a sensor pixel is in the range of about 1:2.19 1:4, and
   (ii) the ratio of the surface area of the core of each individual optical fiber of said fiber optic network to the surface area of a phosphor pixel is in the range of about 1:4 to 1:160.

2. The radiation detector of claim 1 wherein said ratio in (ii) is in the range of about 1:4 to 1:64.

3. The radiation detector of claim 2 wherein said ratio in (ii) is in the range of about 1:16 to 1:30.

4. The radiation detector of claim 1 wherein said fiber optic network comprises a fiber optic faceplate.

5. The radiation detector according to claim 4 wherein a microlens array is positioned between said fiber optic faceplate and said array of pixelized phosphors.

6. The radiation detector of claim 4 wherein at least a portion of the optical fibers of the fiber optic faceplate are inclined to the array of pixelized phosphors.

7. The radiation detector of claim 6 wherein said fiber optic faceplate is tapered.

8. The radiation detector of claim 1 wherein said array of pixelized sensors is based on single crystal silicon.

9. The radiation detector of claim 1 wherein said array of pixelized sensors are formed on back-illuminated thinned-out single crystal silicon.

10. The radiation detector according to claim 1 wherein said fiber optic network is adhesively attached to said array of pixelized sensors.

11. The radiation detector according to claim 1 wherein said pixelized phosphor is fabricated directly on the surface of said fiber optic network.

12. An X-ray radiation detector comprising:
   (a) a fiber optic network;
   (b) an array of pixelized phosphors on the X-ray incidence side of said fiber optic network; and
   (c) an array of pixelized sensors optically coupled to the other side of said fiber optic network, wherein:

(i) the ratio of the surface area of a phosphor pixel to the surface area of a sensor pixel is in the range of about 1:2 to 1:64, and (ii) the ratio of the surface area of the core of each individual optical fiber of said fiber optic network to the surface area of a phosphor pixel is in the range of about 1:4 to 1:160.

13. The radiation detector according to claim 12 wherein said ratio in (i) is in the range of about 1:2 to 1:16.

* * * * *

UNITED STATES PATENT AND TRADEMARK OFFICE
CERTIFICATE OF CORRECTION

PATENT NO.: 5,391,879

DATED: February 21, 1995

INVENTOR(S): Nang T. Tran and Luciano W. Morrone

It is certified that error appears in the above-identified patent and that said Letters Patent is hereby corrected as shown below:

Column 12, line 30, ".19" should read -- to --.

Signed and Sealed this

Twenty-fifth Day of April, 1995

Attest:

BRUCE LEHMAN

*Attesting Officer*      *Commissioner of Patents and Trademarks*